United States Patent Office 3,323,931
Patented June 6, 1967

3,323,931
MANUFACTURE OF PIGMENT COMPOSITIONS
William Black, Frank Hayes, and Arthur Topham, all of Manchester, England, assignors to Imperial Chemical Industries Limited, London, England, a corporation of Great Britain
No Drawing. Filed Mar. 1, 1965, Ser. No. 436,306
Claims priority, application Great Britain, Mar. 11, 1964, 10,305/64
3 Claims. (Cl. 106—288)

This invention relates to pigment compositions having improved resistance to flocculation, and to the manufacture of such pigment compositions.

It is known that certain pigments flocculate in organic media, for example when paints or printing inks containing them are stored, or during slow evaporation of solvent from a thick coating, with resultant loss of tinctorial strength and of homogeneity. Flocculation of pigment in a printing ink can also result in increased viscosity. Many pigments also exhibit crystal-growth or polymorphic change in such media as are used for paints and printing inks and this frequently results in shade-change and loss of tinctorial strength. Phthalocyanine pigments, particularly copper pthalocyanine, frequently suffer from all these defects.

Various procedures have been described for improving the resistance of pigments, particularly pthalocyanine pigments, to flocculation and crystal growth. Thus it has been proposed to coat pigment particles with colourless protective substances. The tinctorial strength of a pigment is reduced by coating in this way.

It has further been proposed in British specification No. 972,805 to intimately incorporate with a pigment a minor quantity of an organic pigment derivative containing a secondary or tertiary amino group, the nitrogen atom of said group being attached to the chromophoric portion of the molecule through a methylene group.

According to the present invention there is provided a pigment composition comprising a pigment having intimately incorporated therewith an organic pigment derivative obtained by treating with nitrous acid an organic pigment derivative containing a primary or secondary amino group.

In the organic pigment derivatives comprised within the said compositions at least a portion of the amino groups have undergone reaction with nitrous acid. In the case of secondary amino groups it is believed that nitrosation has occurred. Hereinafter the organic pigment derivatives comprised within the said compositions are referred to as "nitrosated organic pigment derivatives," it being understood that "nitrosated" in this connection signifies "treated with nitrous acid."

The pigment compositions of the invention may be manufactured by incorporating with a pigment a nitrosated organic pigment derivative as aforesaid for example by milling in an aqueous medium, or in an organic solvent or medium.

Alternatively the pigment compositions of the invention may be manufactured by a process which comprises intimately incorporating a pigment with a minor quantity of an organic pigment derivative containing a primary or secondary amino group and treating the product with nitrous acid.

The pigments which are present in the pigment compositions of the invention can be either pigments of the inorganic type such as titanium dioxide, carbon black, iron oxide and Prussian Blue, or preferably, pigments of the organic type. The pigments of the organic type can belong to any of the known series of pigments of the organic type, but preferably they are pigments of the azo, anthraquinone and other polycyclic, and, above all, phthalocyanine series. As examples of such classes of pigments there may be mentioned pigments of the type commonly known as benzidine yellows (which are obtained by coupling tetrazotised benzidine and derivatives thereof with acylacetarylamides), pigments of the quinacridone series, and preferably pigments of the phthalocyanine series such as copper phthalocyanine and its halogeno derivatives such as copper monochlorophthalocyanine.

The nitrosated organic pigment derivatives which are present in the compositions of the invention can be obtained by reacting an organic pigment containing at least one primary or secondary amino group with nitrous acid. The said organic pigments containing primary or secondary amino groups can themselves be obtained by any of the methods known for introducing primary or secondary amino groups into organic pigments. For example chloromethylated organic pigments can be reacted with ammonia or primary amines. As examples of such chloromethylated organic pigments there may be mentioned bis-(chloromethyl)-isodibenzanthrone, copper phthalocyanine containing from 1 to 8 chloromethyl groups, bis- or tris-(chloromethyl) - 4:4' - bis(6 - methylbenzthiazyl)azobenzene and chloromethyl-lin-quinacridone.

As examples of the said primary amines there may be mentioned alkylamines such as methylamine, ethylamine, isopropylamine, n-butylamine, ter-butylamine, octylamine, dodecylamine and cetylamine; cyclic aliphatic amines such as cyclohexylamine, alkylenediamines such as ethylenediamine and hexamethylenediamine; hydroxyalkylamines such as β-hydroxyethylamine and γ-hydroxypropylamine; and substituted alklenediamines such as γ-dimethylaminopropylamine.

The chloromethylated organic pigments can be reacted with the ammonia or primary amines in such a manner that each chlorine atom is replaced by an amino group, for example as described in British specification No. 972,805, or in such a way as to produce polymeric organic pigments as described in Belgian specification No. 651,510.

It is preferred that the said nitrosated organic pigment derivative present in the compositions of the invention is a nitrosated derivative of a phthalocyanine compound of the formula:

$$CuPc\text{\textlbrackdbl}CH_2—X]_n$$

wherein CuPc represents the copper phthalocyanine radical, $n$ represents an integer of from 1 to 8, and X represents a primary or secondary amino group. The secondary amino group represented by X is preferably a group of the formula: —NHR wherein R represents a hydrogen atom or an alkyl, cycloalkyl, hydroxyalkyl or aminoalkyl radical.

The pigment compositions of the invention can be obtained by milling together a pigment and a nitrosated organic pigment derivative, for example in aqueous medium or in an organic liquid or medium. The milling may be carried out by rapid agitation, if desired in the presence of grinding elements or aids such as sand, glass or porcelain beads. If desired the pigment composition, after removal of any grinding element, may be isolated by conventional means and finally dried.

The proportions of pigment and nitrosated organic pigment derivative present in the pigment compositions of the invention are not critical. Pigment compositions containing amounts of the nitrosated organic pigment derivatives corresponding to from 1 to 20% and especially from 2 to 10% by weight of the weight of pigment have excellent properties.

Alternatively the compositions of the invention may be manufactured by milling a pigment and an organic pigment derivative containing a primary or secondary amino group, for example in an aqueous medium, and subsequently adding a water-soluble nitrite, e.g. sodium nitrite and if necessary an acid to the aqueous dispersion so obtained. Milling may advantageously be carried out by rapid agitation or stirring in aqueous medium with particulate grinding elements such as sand, glass or porcelain beads. If desired, an acid such as hydrochloric, acetic, formic or phosphoric acid may be incorporated in the aqueous medium. The quantity of nitrite used will depend upon the organic pigment derivative used and the degree of improvement which is to be attained. In general the quantity of nitrite may usefully be from 10 to 200% and especially from 25 to 100% of the weight of the organic pigment derivative. To promote reaction between the pigment derivative and the nitrous acid the mixture may be stirred, either with or without the grinding elements, for example for 1 to 2 hours at 10° C. to 50° C. e.g. at atmospheric temperatures. When reaction is completed or has proceed as far as is desired, the medium may be made alkaline, for example with sodium hydroxide and the pigment composition may be isolated by filtration or centrifuging, washed and dried.

A preferred class of the compositions of the invention comprises a phthalocyanine pigment selected from copper phthalocyanine and copper monochlorophthalocyanine and a nitrosated derivative of a copper phthalocyanine of the formula:

$$CuPc[CH_2-X]_n$$

wherein CuPc, $n$ and X have the meanings stated above.

The pigment compositions of the invention, especially the phthalocyanine pigment compositions are of value as colouring matters for paints, lacquers, enamels, printing inks, plastic materials and the like and are resistant to flocculation and to crystal growth in non-aqueous media. They are, furthermore, superior to the corresponding pigment compositions disclosed in British specification No. 972,805 and Belgian specification No. 651,510 in that they are highly resistant against diffusion from printed wrapping material into fatty materials such as a soap.

The invention is illustrated but not limited by the following examples in which the parts are by weight.

*Example 1*

40 parts of copper monochloro phthalocyanine, 60 parts of an alpha form copper phthalocyanine, 5 parts of copper tris(isopropylaminomethyl)phthalocyanine (obtained from copper tris-chloromethyl phthalocyanine by the method described in British specification No. 972,805), 24 parts of glacial acetic acid and 371 parts of water are charged into a stainless steel beaker which is fitted with a stirrer and contains 1500 parts of glass beads of 0.45 to 0.5 millimetre diameter. The stirrer is driven at about 1880 revolutions per minute for 1 hour. The dispersion is then diluted with 1000 parts of water and separated from the beads by screening through a gauze of Monel metal, and to it is added a solution of 5 parts of sodium nitrite in 50 parts of water. The mixture is stirred at atmospheric temperature for 2 hours. 2 N sodium hydroxide solution is added until the liquor is alkaline. The blue pigment composition is filtered off, washed with water and dried at 100° C. It is suitable for use in paints, lacquers, enamels, printing inks and plastic materials and is resistant to flocculation. Compared with a pigment composition obtained in similar manner but without the use of sodium nitrite the product is superior in respect of its resistance to diffusion from printed wrapping material into soap.

*Example 2*

Example 1 is repeated, using in place of 5 parts of copper tris-isopropylaminomethyl phthalocyanine 4 parts of a polymeric condensate of copper trischloromethyl phthalocyanine and isopropylamine prepared as described in Belgian specification No. 651,510 under the heading "Polymeric Organic Pigment Derivative I." A similar blue pigment composition is obtained.

*Example 3*

40 parts of copper monochlorophthalolocyanine, 60 parts of an alpha-form copper phthalocyanine, 5 parts of the nitrosated organic pigment derivative obtained as described below, 24 parts of glacial acetic acid and 371 parts of water are charged into a stainless steel beaker which is fitted with a stirrer and contains 1500 parts of glass beads of 0.45 to 0.5 millimetre diameter. The stirrer is driven at about 1880 revolutions per minute for 1 hour. The dispersion is then diluted with 1000 parts of water, separated from the beads by screening through a gauze of Monel metal, and 2 N sodium hydroxide solution is added to it until the liquor is alkaline. The blue pigment composition is filtered off, washed with water and dried at 100° C. It is suitable for use in paints, lacquers, enamels, printing inks and plastic materials.

The nitrosated organic pigment derivative used in this example is obtained as follows:

Copper tris(dimethylaminopropylaminomethyl)phthalocyanine is prepared by stirring a mixture of 105 parts of 3-dimethylaminopropylamine and 364 parts of toluene at 20°–25° C., adding 100 parts of copper tris(chloromethyl)phthalocyanine during 15 minutes, stirring for 2 hours at 20–25° C., raising the temperature to 90° C. during 2 hours and stirring at 90–95° C. for 16 hours. The toluene is removed by steam distillation and the product is filtered off, washed with water and dried. A solution of 20 parts of the product in 400 parts of water and 25.5 parts of acetic acid is stirred at 20° C. whilst 5 parts of sodium nitrite is added. After stirring at 20° for ½ hour 2 N sodium hydroxide solution is added until alkaline. The mixture is stirred at 90–95° for ½ hour and the product is then filtered off, washed with water and dried.

What we claim is:

1. A pigment composition consisting essentially of (1) a pigment selected from the class consisting of copper phthalocyanine, copper monochlorophthalocyanine and their mixtures and (2) a nitrosated derivative of a compound of the formula $$CuPc[CH_2-X]_n$$

wherein CuPc is a copper phthalocyanine radical, $n$ is a positive integer not exceeding 8 and X is selected from the class consisting of primary and secondary amino groups, said derivative being nitrosated with a nitrosating agent in amounts of 10–200 percent by weight of said compound and said nitrosated derivatives being present in amounts of 1 to 20 percent by weight of said pigment.

2. The pigment composition of claim 1 wherein said pigment is a mixture of copper phthalocyanine and copper monochlorophthalocyanine and said derivative is a nitrosated derivative of copper tris(isopropylaminomethyl) phthalocyanine.

3. The pigment composition of claim 1 wherein said pigment is a mixture of copper phthalocyanine and copper monochlorophthalocyanine and said derivative is a nitrosated derivative of copper tris(dimethylaminopropylaminomethyl) phthalocyanine.

References Cited

UNITED STATES PATENTS 3,065,092   11/1962   Geiger et al. _____ 106—288

TOBIAS E. LEVOW, *Primary Examiner.*

J. E. POER, *Assistant Examiner.*